United States Patent [19]
Joneleit

[11] 3,873,123
[45] Mar. 25, 1975

[54] CONTROL SYSTEM FOR REGULATING THE QUANTITY OF PRESSURE MEDIUM IN A SUSPENSION SYSTEM

[75] Inventor: Knut Joneleit, Iserlohn, Germany

[73] Assignee: Hoesch Werke Aktiengesellschaft, Dortmund, Germany

[22] Filed: Jan. 29, 1974

[21] Appl. No.: 437,611

[30] Foreign Application Priority Data
Jan. 30, 1973 Germany............................ 2304295

[52] U.S. Cl............................ 280/124 F, 267/65 D
[51] Int. Cl............................................. B60g 17/04
[58] Field of Search....... 280/124 F, 6 H; 267/65 D, 267/64

[56] References Cited
UNITED STATES PATENTS
| | | | |
|---|---|---|---|
| 3,558,155 | 1/1971 | Jackson | 280/124 |
| 3,584,893 | 6/1971 | Tuczek | 280/124 F |
| 3,666,286 | 5/1972 | Engfer | 280/124 F |

*Primary Examiner*—Philip Goodman
*Attorney, Agent, or Firm*—Michael S. Striker

[57] ABSTRACT

The distance between the body and a wheel axle of a vehicle is determined by the quantity of pressure medium in the suspension system. A first and second switch each changes from a normally open to a closed position when the body of the vehicle is respectively too high and too low relative to the wheel axle. Closing of either switch initiates the charging of a capacitor in a stabilized timing circuit which includes a transistor having a base connected to the capacitor and an emitter connected to a voltage divider which is connected in parallel with the supply voltage and serves to keep the emitter-base voltage of the transistor independent of temperature and supply voltage variations. When the emitter-base voltage reaches a predetermined voltage, voltage is supplied to one terminal of each of two relay coils, the other terminal of which is connected to ground potential via a corresponding one of the switches when closed. The energized relay then causes energization of either a pump for increasing the pressure medium or a valve for decreasing the pressure medium.

6 Claims, 4 Drawing Figures

3,873,123

CONTROL SYSTEM FOR REGULATING THE QUANTITY OF PRESSURE MEDIUM IN A SUSPENSION SYSTEM

BACKGROUND OF THE INVENTION

The present invention relates to suspension systems in which the distance between a first and second member varies as a function of the quantity of pressure medium in the system. In particular it relates to such systems as used in commercial vehicles wherein the level of the body of the vehicle relative to the wheel axis is maintained under different loading conditions by changing the quantity of the pressure medium in the suspension. In such systems, switches are present which furnish control signals when the actual level of the vehicle body differs from the desired level relative to the wheel axle. The so-furnished control signals are processed in a control circuit whose outputs in turn activate the various elements which determine the quantity of pressure medium in the suspension, such as pumps and valves.

Known arrangements of this type have delay circuits in which the delay is determined by a resistor-capacitor circuit. However, the operating voltage applied to the resistor-capacitor circuit is not stabilized, whereby variations in the delay time may result from changes in the operating voltage or from changes in the ambient temperature in which the circuit is operating.

It has been suggested that a Zener diode-resistor combination may be used to stabilize the voltage source, that is may be used to keep the variation of the operating voltage within predetermined limits. However this type of circuit is relatively complicated and expensive.

SUMMARY OF THE INVENTION:

It is an object of the present invention to furnish a control system in which the variation in time delay due to variations in the operating voltage and in the ambient temperature are kept within predetermined limits in a circuit which is simply constructed and relatively inexpensive.

The present invention resides in a suspension system wherein a first member is suspended relative to a second member and wherein the distance between said first and second members varies as a function of the quantity of pressure medium in the suspension system. It comprises signal furnishing means which furnish control signals when the distance between said first and second member varies from a predetermined distance by a predetermined increment. It further comprises time delay means connected to said signal furnishing means for furnishing a timing signal a predetermined time interval after receipt of a control signal. The timing circuit means are energized by a supply voltage. Stabilizing circuit means are connected to the timing circuit means for stabilizing the timing circuit means with respect to variations in said supply voltage. Level varying means change the quantity of pressure medium in the suspension system upon energization. Finally, output circuit means are connected to the timing circuit means, the signal furnishing means, and the level varying means, for energizing the level varying means in the presence of a control signal and upon receipt of a timing signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
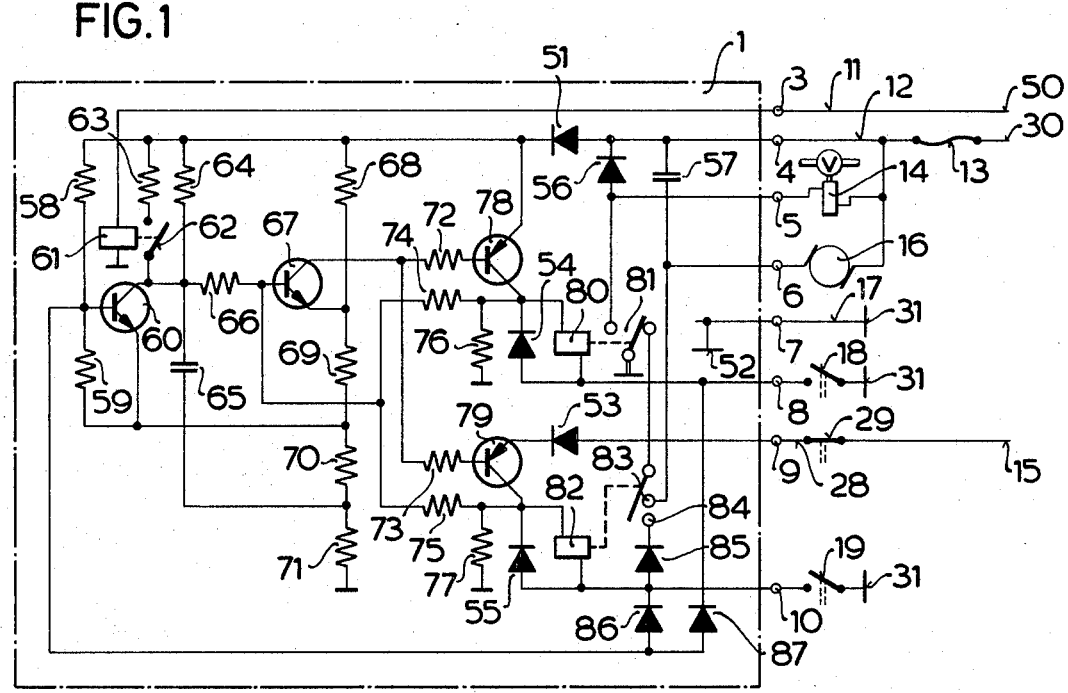
FIG. 1 is a schematic diagram of an electronic control circuit having external terminals for connection to the suspension system.

DESCRIPTION OF THE PREFERRED EMBODIMENTS:

A preferred embodiment of the present invention will now be described with reference to the drawings.

Prior to proceeding with the description an explanation of the Figures, certain basic assumptions which underlie the operation of the preferred embodiments, but which need not of course be present for the practice of the invention when used in conjunction with other embodiments, will first be set forth.

The assumptions are the following:

1. A voltage is supplied by the vehicle supply having a positive voltage with respect to ground applied at reference numeral 30.

2. The pressure medium supply is effected by an electrically driven pump 24. An electromotor 16 drives pump 24. When the pump and the electromotor are inoperative, no regulation is taking place. When the pump is operative, the operation "lift" is being carried out, that is the body 31 of the vehicle is raised relative to axles 32–34.

3. A decrease of pressure medium is effected by operation of solenoid valve 14. The solenoid valve opens upon application of a voltage to its windings and closes when no voltage appears across its windings. When the valve is open, the pressure medium is decreased causing the body of the vehicle to be lowered relative to the axles. This operation herein is referred to as a "lowering" operation.

4. The control signals are furnished by the closing of level switches 18–23. These are normally open switches which are closed when the body of the vehicle is in a position either higher or lower than the desired position relative to the axles. The switches are mounted in a housing in which there are at least two such switches, one to generate the control signal signifying the operation lift and the second to signify the necessity for initiating the operation lower. These switches are mechanically intercoupled in such a way that both switches may be simultaneously open, but that only one may be closed at any one time. Further, control rods 25–27 are furnished which couple the switches, which are mounted on vehicle body 31 to axles 32–34.

Figure 2:
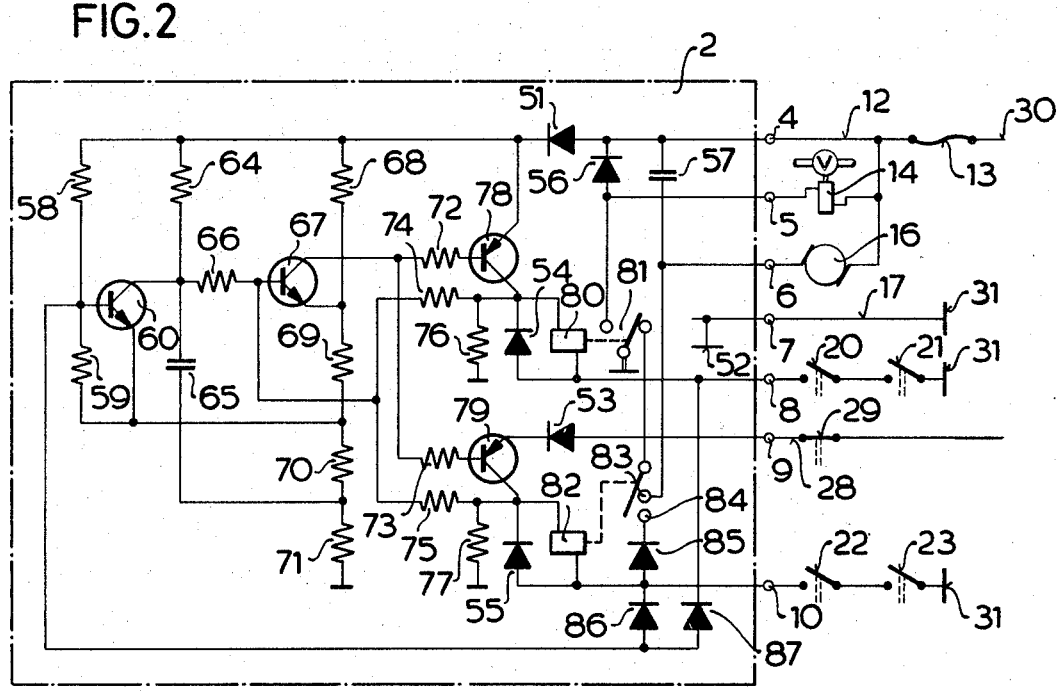
FIG. 2 is an alternate embodiment of FIG. 1 including pairs of level control switches.

The circuits shown in FIGS. 1 and 2 each have terminals 4–10 at which they are connectable to the level control mechanisms and the control switches. A terminal 3 is shown only in FIGS. 1 and 3 and is connected through a line 11 to a terminal 50 which has the positive supply voltage applied to it only during starting of the motor. Terminal 4 is connected via a line 12 and a fuse 13 with terminal 30 which is the positive terminal of the vehicle battery.

Figure 3:
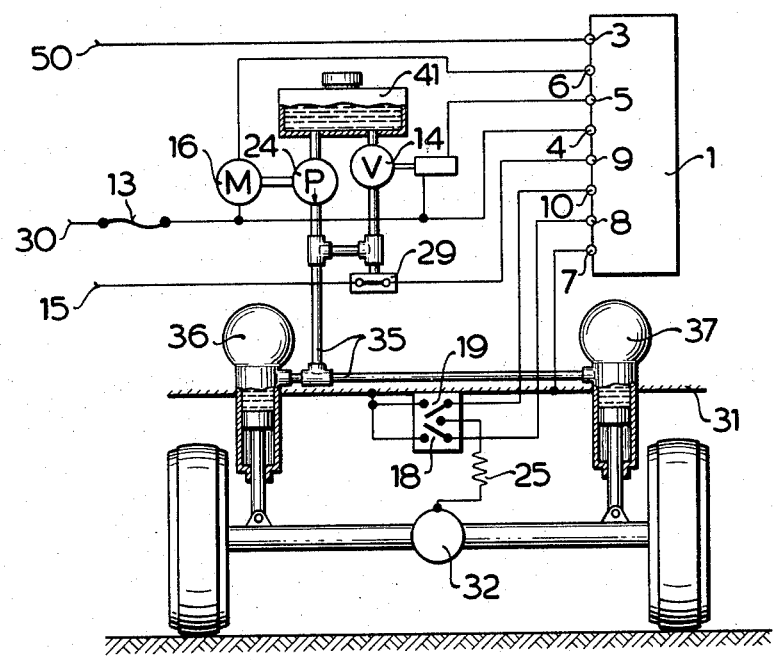
FIG. 3 is a schematic diagram showing the hydraulic level control means to be connected to the circuit of FIG. 1.

A solenoid valve 14 is connected between terminal 5 and fuse 13. This valve serves to decrease the amount of pressure medium in the suspension system. Electromotor 16 which drives pump 24 which increases the quantity of pressure medium in the suspension system is connected between one terminal of fuse 13 and terminal 6. Vehicle ground indicated by reference numeral 31 is connected to terminal 7 via a line 17. The level or control switches 18–23 are connected to terminals 8–10. Control switch 18, when closed, furnishes the control signal initiating the lower operation, while switch 19 when closed indicates the control signal for lift (FIGS. 1 and 3). In the alternate embodiment illustrated in FIGS. 2 and 4, two switches, 20,22; 21,23 are connected on each side of the vehicle, switches 20 and 23, when closed simultaneously, initiating the lift operation, while switches 20 and 21 when both are closed initiate the control operation for lowering the body of the vehicle. A high pressure control switch 29 is present in line 28 which connects terminal 9 to vehicle terminal 15. The last has voltage only when the ignition of the vehicle is activated. The function of switch 29 will be discussed in greater detail below.

As mentioned above, the positive supply voltage is applied at terminal 4 to the circuits of FIGS. 1 and 2. A diode 51 connected to terminal 4 serves to protect the circuit from voltages of incorrect polarity. Ground connection 7 of the control circuit is connected to vehicle ground by line 17. The control circuit ground is designated by reference numeral 52. A further diode 53 is connected to terminal 15 to prevent damage due to voltages of incorrect polarity applied at this terminal. Diodes 54 and 55 serve as protective diodes for relay coils 80 and 82 while diode 56 serves the same function for solenoid valve 14 and capacitor 57 is connected in parallel with motor 16 for noise suppression purposes.

Transistors 67 and 68 together form a threshold amplifier. Resistor 66, connected to the base of transistor 67, serves as input resistor. A voltage divider comprising four resistors 68–71 sets the threshold at which the threshold amplifier switches state. Resistor 76 is a load resistor for transistor 78 and resistor 74, a feedback resistor, is connected from the collector of transistor 78 to the base of transistor 67. Similarly, the second output stage of the threshold circuit comprises a transistor 79 having a base connected to the collector of transistor 67 through a resistor 73, a load resistor 77, and a feedback resistor 75 connected from the collector of transistor 79 to the base of transistor 67. The bases of transistors 78 and 79 are thus both connected to the collector of transistor 67 and the collectors are brought to a common point through resistors 74 and 75. As a result of this connection transistors 78 and 79 become conductive simultaneously when transistor 67 becomes conductive. As mentioned before, the feedback resistors are so chosen that the circuit exhibits a true bistable behavior. Also connected to the collectors of transistors 78 and 79 respectively is one terminal of relay coils 80 and 82 respectively. The other terminal of the relay coils is connected to terminals 8 and 10 respectively. These terminals are connected to vehicle ground through switches 18 and 19 respectively.

The voltage divider controlling the voltage at the emitter of transistor 67 comprises resistor 68 and the sum of the resistors 69, 70 and 71. The major function of this voltage divider is to set the threshold for the threshold stage. use of the correct components for resistors 69, 70 and 71 causes a feedback voltage to be developed which varies with temperature in such a manner that the overall circuit is temperature stabilized. Further, the circuit has a so-called floating emitter, that is the voltage at the emitter of transistor 67 will vary as a function of changes in supply voltage in such a manner as to compensate for changes in the voltage at the base of transistor 67 which results from the same changes in the supply voltage. The time delay effected by the circuit will thus remain constant, independent of supply voltage variations.

Specifically, the time delay is effected by use of the charging characteristic of capacitor 65. While transistor 60 is blocked, capacitor 65 charges through resistor 64. Since an increase in the supply voltage would cause the RC charging curve to have a steeper slope, the delay time would be shortened if the threshold voltage of the stage were fixed. However, in the circuit shown in FIG. 1, and as described above, the voltage at the emitter of transistor 67 will also change with changing supply voltage, thereby causing the threshold to be adjusted to a value which keeps the time required for charging the capacitor to pass this threshold a constant. Capacitor 65 is discharged through the emitter-collector circuit of transistor 60 when transistor 60 is conductive. The circuit is so dimensioned that transistor 60 is conductive until such time as closing of one of the control switches causes ground potential to be applied to the base, thereby blocking transistor 60. Specifically, switch 18 when closed applies vehicle ground to terminal 8 and, through diode 87, to the base of transistor 60. Similarly, closing of switch 19 applied vehicle ground 31 to terminal 10 and thence through diode 86 to the base of transistor 60. In order that transistor 60 will definitely be blocked even under conditions of wide temperature and supply voltage variations, its potential is raised relative to ground potential by use of a second voltage divider tap on the voltage divider which also fixes the potential of the emitter of transistor 67. Thus the emitter of transistor 60 is connected to the common point of resistors 69 and 70.

If during the operation of the vehicle, dynamic oscillations occur, the level switches may be operated intermittently causing an intermittent operation of transistor 60. Thus a number of control pulses may be integrated and regulation can occur suddenly following a relatively long pulse sequence. In order to prevent this, the reset time of the circuit must be extremly short. The reset time is of course the time required to discharge capacitor 65. This discharge takes place through the emitter-collector circuit of transistor 60 when transistor 60 is conductive and through resistor 70 which is connected in series with the emitter-collector circuit of transistor 60. The ohmic value of resistor 70 relative to the capacitance value of capacitor 65 determines the reset time. Since, as stated above, the emitter of transistor 60 must be at a positive potential relative to ground, resistor 70 is part of the voltage divider which comprises, as stated above, resistors 68–71.

Relay 61 shown in FIG. 1 has a contact 62 which, when closed, connects a resistor 63 to the collector of transistor 60. This relay serves to shorten the delay time furnished by the circuit. For example, if terminal 3 is at the positive supply voltage, the coil of relay 61 is energized causing contact 62 to close. Resistor 63, which is of substantially lower resistance than is resistor 64 to which it is connected in parallel when contact 62 is closed then causes a substantial shortening of the charge time of capacitor 65. This of course decreases the delay time furnished by the circuit.

It should be noted that relay 82 has contacts 83,84 which, following the initial energization of relay 82, serve as holding contacts. That is, these contacts maintain the energization of relay 82 and also the energization of motor 16 even after contacts 22,23 which will be described below have opened. These contacts, in conjunction with a diode 85 which is connected between one terminal of relay coil 82 and the above-mentioned holding contacts, thus serve to, in effect, store the command for increasing the quantity of pressure medium in the suspension, thereby continuing to lift the body of the vehicle relative to the wheel axle even after switches 22–23 which originally indicated the necessity for the lifting operation have opened.

In the following, the operation of the level control of the present invention under different operating conditions will be explained in greater detail.

Figure 4:
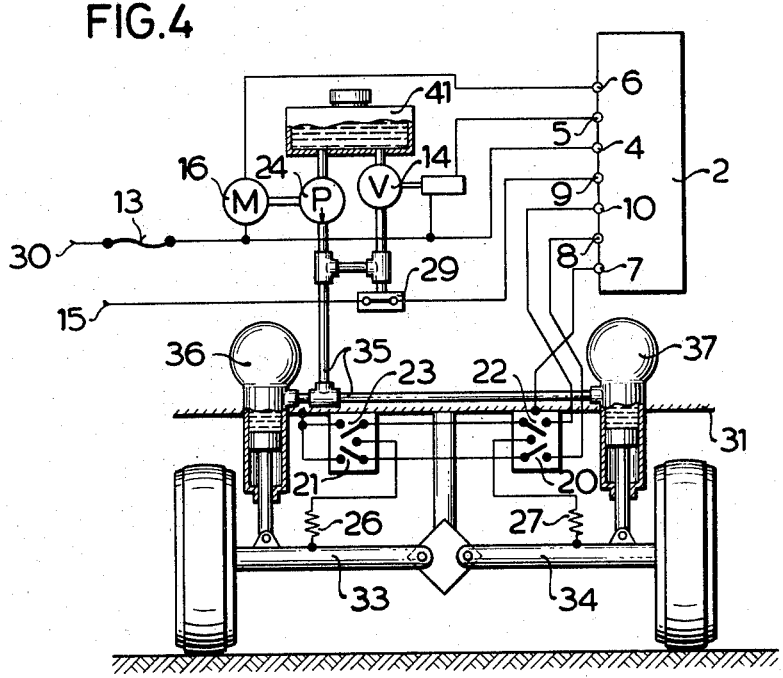
FIG. 4 is a schematic diagram of the hydraulic level control elements to be connected to the control circuit of FIG. 2.

First, let it be assumed that in the position of the vehicle shown in FIGS. 3 and 4, the level of carriage 31 is the desired level and the vehicle ignition has not been turned on. Switches 18–23 are open, electromotor 16 stands still and solenoid valve 14 is closed. Under these conditions, the following operating conditions exist in FIGS. 1 and 2:

Transistor 60 is conductive, capacitor 65 is discharged, transistors 67, 78 and 79 are blocked, relays 80 and 82 are deactivated so that the associated relay contacts are in the position shown in the Figures.

Let it now be assumed that vehicle 2, starting with the position in FIG. 3, is loaded. The body of the vehicle (carriage) thus descends, moving closer to vehicle axis 32. This causes switch 19 to be closed via linkages 25. Vehicle ground 31 is thus connected to terminal 10 and, through diode 86 to the base of transistor 60. Further, one terminal of relay coil 82 is also grounded. Under these conditions, transistor 60 is blocked and capacitor 65 charges through resistor 64 until the threshold value of the amplifier is reached. At this point transistor 67 becomes conductive. Transistor 78 also becomes conductive, but relay 80 is not yet energized since its other terminal is as yet disconnected from ground. Diode 87 prevents the ground connection from being applied to terminal 8. If now the ignition is turned on, the operating voltage is applied through high pressure switch 29, terminal 9, and diode 53 to the emitter of transistor 79. Since transistor 79 is a pnp transistor, it now becomes conductive. The winding of relay 82 thus becomes energized closing contacts 83,84. Terminal 6 is thus connected to ground through contacts 83,84 and the normally closed contact 81. The chassis ground is established from vehicle ground 31 through line 7 and terminal 7.

Electromotor 16 is of course connected through fuse 13 to the positive side of the supply. Its other terminal is now connected to ground potential, causing the motor to become energized. Hydraulic pump 24 is now driven which causes pressure medium to be furnished to the spring elements 36 and 37 of the vehicle suspension from a container 41 through lines 35. With the increase of pressure fluid to spring elements 36 and 37, which are of course mounted between the axle 32 and the body of the vehicle 31, body 31 is lifted relative to axle 32 until such time as linkages 25 open switch 19.

If it is now assumed that an overload is applied to the vehicle, body 31 can no longer be lifted properly. This causes switch 19 to be closed and additional pressure medium to be continually furnished to spring elements 36 and 37. Damage could result except for the presence of high pressure switch 29 which serves to discontinue the lifting operation when sufficient pressure has built up in the line. Reference to FIGS. 1 and 2 will show that opening of switch 29 causes the operating voltage to be removed from the emitter of transistor 79. If, subsequently, the excessive load is removed, body 31 can again rise causing the pressure in the hydraulic system to decrease. High pressure switch 29 is closed again so that the pump can continue to furnish pressure medium to the spring elements.

Without diode 85 which allows use of contacts 83,84 as holding contacts, the lifting operation would be terminated upon opening of switch 19, since the connection to ground would then be broken both for relay coil 82 and transistor 60. However, the ground connection is maintained through diode 85, holding contacts 83,84 and the normally closed contacts 81. Pump 24 therefore continues to operate until such time as carriage 31 has been lifted to the value which suffices to cause linkage 25 to close switch 18. Closure of switch 18 causes ground potential to be applied to terminal 8 and thence to one terminal of relay 80. Energization of relay 80 which takes place since transistor 78 is conductive, causes contacts 81 to switch, thereby disconnecting the ground connection for relay 82 and transistor 60. However, the ground connection for the base of transistor 60 is maintained through diode 87 and the ground applied at terminal 8. Transistor 60 thus remains blocked, while relay 82 is deenergized causing motor 16 to be deenergized and thus stopping the pumping operation. The lifting phase of the cycle is thus ended. Simultaneously of course with closing of normally open contact 81 solenoid valve 14 is energized allowing fluid to return to container 41 from spring elements 36. This causes a decrease in the level of carriage 31 relative to axle 32 which, finally, causes an opening of switch 18. When switch 18 opens, relay 80 is deenergized opening the normally open contact 81 thereby causing solenoid valve 14 to close. Further, the ground connection which had been maintained from terminal 8 through diode 87 to the base of transistor 60 is broken. Transistor 60 thus becomes conductive. Capacitor 65 discharges through the emitter-collector circuit of transistor 60. The threshold circuit again switches state causing transistor 67,78 and 79 to block. The lift operation has thus terminated.

When the vehicle shown in FIG. 3 is unloaded, carriage 31 moves away from axle 32 causing switch 18 to be closed by linkages 25. Vehicle ground 31 is applied through switch 18 to terminal 8 and thence to diode 87 and the base of transistor 60. Simultaneously a ground connection obtains for one terminal of relay coil 80. Transistor 60 is blocked, capacitor 65 charges through resistor 64 until the threshold voltage of the threshold stage is reached and transistor 67 becomes conductive. When transistor 67 becomes conductive, so does transistor 78 causing the coil of relay 80 to be energized, thereby closing its normally open contact. Transistor 79 also becomes conductive but the winding of relay 82 is not energized since, due to the presence of diode 86, no ground connection exists at terminal 10. Terminal 5 is connected to ground potential through normally open contact 81, energizing solenoid valve 14. The pressure medium then flows from spring elements 36, 37 through lines 35 into container 41. Carriage 31 then descends in the direction of axle 32 until linkages 25 again open switch 18. When this happens, the ground connection to relay coil 80 via terminal 8 is lifted so that relay 80 is deenergized, causing the normally open contacts 81 to open and solenoid valve 14 to be deenergized. The valve thus closes. Further, the ground connection from terminal 8 via diode 87 to the base of transistor 60 is also broken causing this transistor to become conductive. Again capacitor 65 is discharged, the threshold circuit changes state and transistor 67, 78 and 79 are blocked causing the lower operation to be completed.

Even though, as shown in FIG. 3, the level switch arrangement with switches 18 and 19 is centrally located through linkage 25 relative to axle 32, it can happen that switch 18 is closed when the vehicle rounds a curve, since no point on the axle exists where the switch elements can be mounted without the possibility of such operation. It is thus necessary that the delay time in the electronic circuitry is at least as long as the longest possible time which is required for the vehicle to round a curve. Since, however, a level regulation is to be carried out either immediately prior or at the start of the trip, relay 61 is provided which is energized while the engine is being started. This causes its contact 62 to close thereby connecting resistors 63 which, as mentioned above, has a substantially lower resistance than resistor 64, in parallel with the latter. This decrease the delay time substantially allowing the regulation to take place substantially simultaneously with starting of the vehicle.

An alternate embodiment is shown in FIG. 4. In this embodiment, the above-mentioned possibility of unwanted regulation while the vehicle rounds a curve is suppressed by the switch arrangement itself. As shown in FIG. 2 switches 21 and 23 are mounted on one side of the axle while switches 20 and 22 are mounted on the other side. Reference to FIG. 2 which shows the corresponding electronic circuit diagram, shows that switches 20 and 21 must be closed simultaneously in order to start the lower operation and switches 22, 23 must be closed simultaneously to start the lift operation. If, for example, the vehicle makes a turn to the right, axle 33 and linkage 26 will operate to close switch 23, while axle 34 through linkage 27 will close switch 20. However, it will be noted that the operation of these switches has no effect at all on the circuit of FIG. 2 since switch 21 and 22 is still open. With this type of arrangement for the control signal furnishing switches, the delay time of the circuit with capacitor 65 and resistor 64 can be kept quite low since it must only cover time intervals sufficient to take into account acceleration and deceleration of the vehicle. Thus, for the embodiment shown in FIG. 2, it is not necessary to furnish a relay 61, since the basic delay time is short in any case. Except for this decrease in delay time, the circuit of FIG. 2 is identical to that of FIG. 1.

The fuses are arranged in FIGS. 1 and 2 in such a manner that a break in a line does not cause any of the fuses to burn out. These burn out only when short-circuits occur from the various terminals 3–10 relative to ground 31. Specifically, the following will occur upon short-circuiting of the various terminals:

terminal 3 — the fuse of terminal 50 blows;
terminal 4 — fuse 13 blows;
terminal 5 — valve 14 remains open until the vehicle has reached the lowest possible level;
terminal 6 — hydraulic motor 16 is activated until the vehicle has been lifted to its topmost position;
terminal 8 — valve 14 remains open until the carriage has reached its lowest possible position;
terminal 9 — fuse of terminal 15 blows;
terminal 10 — the vehicle body is alternately lowered and raised.

While the invention has been illustrated and described as embodied in specifically mounted control switches and with a particular type of threshold circuit, it is not intended to be limited to the details shown, since various structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a suspension system for suspending a first member relative to a second member and wherein the distance between said first and second members varies as a function of the quantity of pressure medium in said suspension system, in combination, signal furnishing means for furnishing a control signal when said distance between said first and second member varies from a predetermined distance by at least a predetermined increment; supply means for furnishing a supply voltage; timing circuit means energized by said supply voltage and connected to said signal furnishing means for furnishing a timing signal a predetermined time interval following receipt of said control signal, said predetermined time interval having undesired variations as a function of changes in said supply voltage; stabilizing circuit means including a voltage divider circuit connected to said timing circuit means for stabilizing said timing circuit means with respect to said variations in said supply voltage; level varying means for changing the quantity of said pressure medium in said suspension system upon energization; and output circuit means connected to said timing circuit means, said signal furnishing means and said level varying means for energizing said level varying means in the presence of said control signal and upon receipt of said timing signal.

2. A system as set forth in claim 1, wherein said timing circuit means comprise a transistor having a base connected to said signal furnishing means and an emitter-collector circuit changing from a first to a second state upon receipt of said control signal, and a resistor-capacitor circuit connected to said supply means and said first transistor in such a manner that the voltage across said capacitor varies as a predetermined function of time when said emitter-collector circuit is in said second state; wherein said voltage divider circuit is connected in parallel with said supply means and has a voltage divider tap; and wherein said stabilizing circuit means further comprise a transistor having a base connected to said resistor-capacitor circuit, an emitter connected to said voltage divider tap and a collector connected to said output circuit means, said transistor changing from a blocked to a conductive state thereby furnishing said timing signal when the voltage between said base and said emitter reaches a predetermined voltage.

3. A system as set forth in claim 2, wherein said signal furnishing means comprise a first and second switch each having a first state when said distance between said first and second member is said predetermined distance, and a second state when said distance respectively exceeds and is less than said predetermined distance, said first and second switches furnishing said control signal to a first and second terminal respectively when in said second state; wherein said level varying means comprise first and second level varying means for, respectively, decreasing and increasing said quantity of pressure medium in said suspension system; and wherein said output circuit means comprise a first output circuit for energizing said first level varying means when said first switch is in said second state and in response to said timing signal and a second output circuit for energizing said second level varying means when said second switch is in said second state and in response to said timing signal.

4. A system as set forth in claim 3, wherein said first and second output circuit respectively comprise a first and second relay and a first and second relay control transistor respectively connected to said first and second relay, each for energizing the corresponding one of said first and second relays when the corresponding one of said first and second switches is in said second state.

5. A system as set forth in claim 4, further comprising holding circuit means for maintaining the energization of said second relay until said second switch switches from said first to said second state.

6. A system as set forth in claim 1, wherein said timing circuit means, said stabilizing circuit means and said output circuit means are mounted in a unit having a plurality of output terminals for connection to said supply means, said level varying means and said signal furnishing means; further comprising at least one fuse connected between said supply means and the corresponding one of said output terminals, for preventing damage to the circuit means in said unit upon short-circuiting of one of said terminals.

* * * * *